June 21, 1949.  H. E. HUBER ET AL  2,473,953
RELIEF VALVE FOR HYDRAULIC SYSTEMS
Filed Aug. 13, 1947
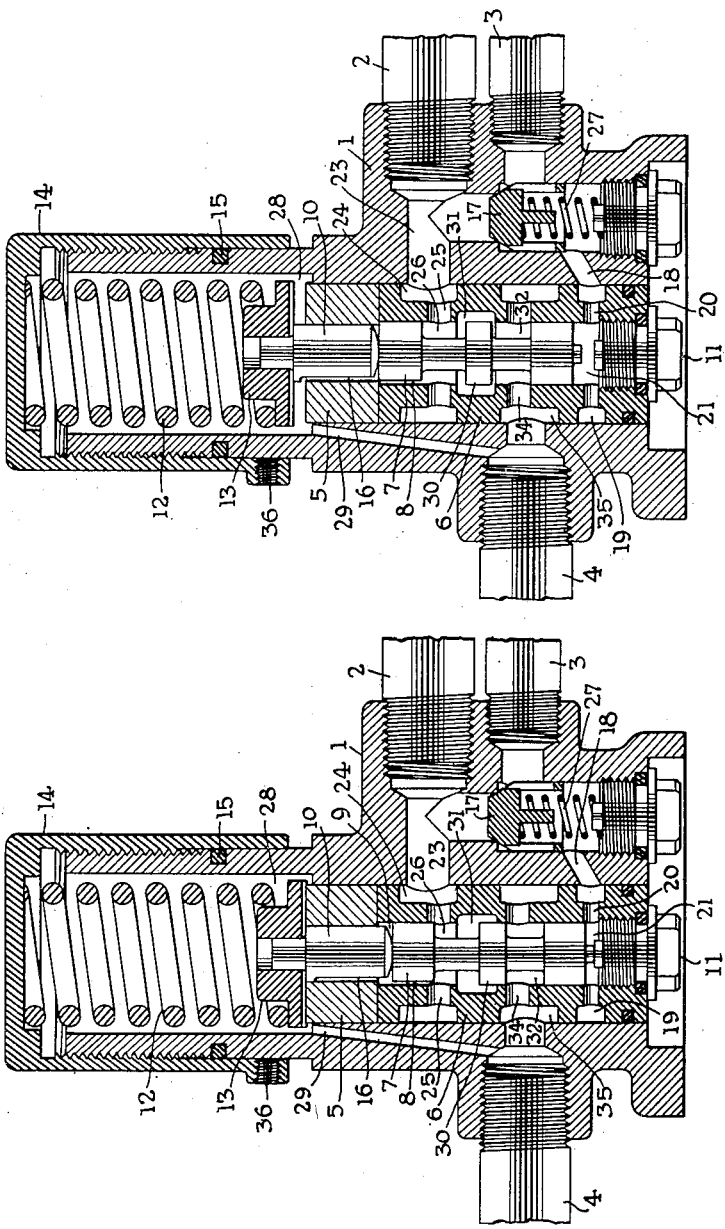
Inventors
Howard E. Huber
and Matthew W. Huber
By Dodge & Ostien
Attorneys Patented June 21, 1949

2,473,953

UNITED STATES PATENT OFFICE 2,473,953

RELIEF VALVE FOR HYDRAULIC SYSTEMS

Howard E. Huber and Matthew W. Huber, Watertown, N. Y., assignors to The New York Air Brake Company, a corporation of New Jersey Application August 13, 1947, Serial No. 768,344

5 Claims. (Cl. 137—153)

This invention relates to an hydraulic pressure control mechanism, specifically an unloading valve, which will operate to relieve the load on a pump when a predetermined maximum pressure is reached in an accumulator or other hydraulic equipment supplied by this pump, and which will reestablish the hydraulic connection between said pump and accumulator, and load the pump when the pressure therein falls below a predetermined minimum value.

The valve embodying the invention is reliable in its working and yet is easily and economically manufactured, because of its simplicity.

Figure 1 is a vertical axial section of the valve in its normal or charging position.

Figure 2 is a similar view showing the valve in the non-charging position.

The valve comprises a body 1 having three connections thereto, the supply connection 2 from the pump (not shown), the connection 3 to the accumulator or other hydraulic equipment to be supplied with pressure liquid, and the connection 4 through which fluid flows to a low pressure sump when the valve is in the non-charging position.

Into valve body 1 are pressed two bushings 5 and 6, the bushings having their bores in axial alinement, and the bore of bushing 5 being smaller than that of bushing 6. Slidable in the bushing 6 is a combined piston and valve 7 which in its normal position (shown in Fig. 1) prevents flow from the inlet connection 2 to the sump connection 4, and when in its upper or unloading position (Fig. 2) establishes a flow path from the inlet 2 to the sump connection 4. The upper of the three lands on said combined piston and valve 7 is cut away on one side at 8 to permit restricted flow of hydraulic fluid through passage 8 to space 9 which is defined by the upper end of said combined piston and valve 7 and the bushings 5 and 6, and the rounded lower end of the spring loaded plunger relief valve 10 which bears against the combined piston and valve 7. The plunger relief valve 10 is slidable in bushing 5 and is axially alined with the combined piston and valve 7. Valve 10 is biased toward its normal position by a spring 12 which reacts between a seat 13, mounted on the upper end of said plunger relief valve 10, and a combined spring seat and cap 14 threaded on said valve body 1. Leakage between the cap 14 and the valve body 1 is prevented by a gasket 15.

A plug 11 is threaded into the lower end of the bushing 6 and furnishes a means of access to the interior of the valve. The plug 11 also acts as a stop to limit the downward movement of the combined piston and valve 7.

On one side of the plunger relief valve 10 is a flatted portion 16 which extends from the lower end of the valve 10 to a point slightly below the upper end thereof. In this way a normally closed flow passage of slightly larger cross sectional area than passage 8 is provided.

In the charging position (Fig. 1), the hydraulic fluid entering the valve through the inlet connection 2 flows past the spring-loaded check valve 17 to the accumulator connection 3 and through the passageway 18 to an annular chamber 19 encircling the bushing 6, then through the radial ports 20 to the space 21 below the combined piston and valve 7. The incoming fluid also flows through a passageway 23 to the annular chamber 24 encircling bushing 6 and thence through the radial ports 25 to space 26, and through the restricted passageway 8 to space 9 above the combined piston and valve 7. The combined piston and valve 7 is therefore substantially in hydraulic balance. A slight downward bias is caused by the pressure drop through the spring loaded check valve 17. The check valve spring 27 may be of any suitable stiffness, but is preferably quite light.

When the pressure in the space 9 becomes great enough to overcome the downward force of the spring 12, the plunger relief valve 10 will start to move up. Until the plunger relief valve 10 moves sufficiently far to permit flow from the space 9 through the passage 16, the combined piston and valve 7 will remain under its slight downward bias and will not move. When the movement of the valve 10 is great enough to establish flow through the passage 16, the pressure in chamber 9 will drop, inasmuch as the cross sectional area of passage 16 is greater than that of passage 8. The fluid will flow from the passageway 16 into the chamber 28 and then through the passage 29 to the sump connection 4.

This subjects the combined piston and valve 7 to a substantial upward hydraulic pressure bias. This causes valve 7 to move to its upper position, as shown in Fig. 2. The upward movement of the combined piston and valve is limited by the lower face of the bushing 5.

Since in the upper position the land 30 on the combined piston and valve 7 no longer engages the bushing 6, hydraulic fluid will flow from the chamber 31 into the chamber 32 and through the radial ports 34 to the annular chamber 35 encircling the bushing 6 and then to the sump connection 4. The check valve 17 prevents back flow from the accumulator or other device connected at 3.

The valve 7 will resume its normal charging position when the pressure in chamber 21 falls below the amount necessary to compress the spring 12. This pressure will be lower than the pressure required to open the valve as the area of lower face of the combined piston and valve 7 is greater than that of the plunger relief valve 10. The pressure range between the opening and closing of the valve is small since the difference between the areas of the plunger relief valve 10 and the combined piston and valve 7 is small. The pressure to operate the valve may be changed by simply loosening the set screw 36 and adjusting the cap 14 in relation to the valve body.

What is claimed is:

1. An unloading valve mechanism, comprising a body having a first connection for a pressure-pump discharge, a second connection for a device to which said pump normally supplies liquid under pressure, a discharge passage, and a cylindrical valve seat with ports leading respectively from the first connection and to the discharge passage; a check valve permitting one way flow from the first to the second connection; a combined piston and valve mounted in said cylindrical seat, and having a normal position in which it obstructs flow between said ports and a venting position in which it connects the same; means affording a restricted communication through which pressure in the first connection reacts on said combined piston and valve to urge it toward normal position, and a communication through which pressure in the second connection exerts an opposing force reaction, the parts being so proportioned that the valve remains in normal position when subject to the opposing forces so developed; and means responsive to excess pressure in the first connection to dissipate pressure beyond said restricted communication, whereby the combined piston and valve is caused to move to venting position.

2. The combination defined in claim 1 in which the means responsive to excess pressure comprises a spring-loaded plunger relief valve alined with said combined piston and valve and subject to the pressure acting on the latter beyond said restricted communication, said relief valve when moved in a closing direction by its spring serving first to terminate its venting action and then to force the combined piston and valve to its normal position.

3. The combination defined in claim 1 in which the means responsive to excess pressure comprises a spring-loaded plunger relief valve alined with said combined piston and valve of smaller effective area and subject to the pressure acting on the latter beyond said restricted communication, said relief valve when moved in a closing direction by its spring serving first to terminate its venting action and then to force the combined piston and valve to its normal position.

4. The combination defined in claim 1 in which the combined piston and valve is substantially hydraulically balanced when in its normal position, and the means responsive to excess pressure comprises a spring-loaded plunger relief valve alined with said combined piston and valve in the opening path thereof and subject to pressure acting thereon beyond said restricted communication, the parts being so arranged that the opening motion of the relief valve frees the combined piston and valve, destroys the hydraulic balance and so causes the combined piston and valve to move to its venting position, whereas in its closing motion the relief valve restores said hydraulic balance and then engages the combined piston and valve and shifts it to its normal position.

5. The combination defined in claim 1 in which said check valve is lightly spring-loaded and the combined piston and valve is hydraulically balanced when in normal position except for a pressure differential toward such position produced by such loading; and the means responsive to excess pressure comprises a spring-loaded plunger relief valve, alined with said combined piston and valve in the opening path thereof and subject to pressure acting thereon beyond said restricted communication, the parts being so arranged that the opening motion of the relief valve frees the combined piston and valve, destroys the hydraulic balance and so causes the combined piston and valve to move to its venting position, whereas in its closing motion the relief valve restores said hydraulic balance and then engages the combined piston and valve and shifts it to its normal position.

HOWARD E. HUBER.
MATTHEW W. HUBER.

REFERENCES CITED

The following references are of record in the file of this patent:

UNITED STATES PATENTS

| Number | Name | Date |
|---|---|---|
| 2,015,801 | Johnson | Oct. 1, 1935 |